(12) United States Patent
Perkins

(10) Patent No.: US 9,389,334 B2
(45) Date of Patent: Jul. 12, 2016

(54) RADIATION GENERATOR HAVING AN ACTIVELY EVACUATED ACCELERATION COLUMN

(71) Applicant: Schlumberger Technology Corporation, Sugar Land, TX (US)

(72) Inventor: Luke Perkins, Plainsboro, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/540,750

(22) Filed: Nov. 13, 2014

(65) Prior Publication Data

US 2016/0139295 A1    May 19, 2016

(51) Int. Cl.
*G01V 5/08* (2006.01)

(52) U.S. Cl.
CPC ........................... *G01V 5/08* (2013.01)

(58) Field of Classification Search
CPC ............................ G01V 5/101; G01V 11/00
See application file for complete search history.

(56) References Cited

U.S. PATENT DOCUMENTS

| | | | | |
|---|---|---|---|---|
| 3,581,093 A | * | 5/1971 | Carr | H05H 3/06 376/116 |
| 3,786,258 A | * | 1/1974 | Schmidt | H05H 3/06 376/114 |
| 4,093,854 A | * | 6/1978 | Turcotte | G01V 5/102 250/269.2 |
| 4,581,194 A | * | 4/1986 | Givens | H05H 3/06 376/119 |
| 5,608,215 A | | 3/1997 | Evans | |
| 6,754,586 B1 | | 6/2004 | Adolph et al. | |
| 8,431,885 B2 | | 4/2013 | Roscoe et al. | |
| 8,610,352 B2 | | 12/2013 | Botto et al. | |
| 8,642,944 B2 | | 2/2014 | Saenger et al. | |
| 8,759,750 B2 | | 6/2014 | Thornton | |
| 2009/0045329 A1 | | 2/2009 | Stoller | |
| 2010/0111258 A1 | * | 5/2010 | Reijonen | H05G 2/00 378/123 |
| 2011/0180698 A1 | * | 7/2011 | Stephenson | H05H 3/06 250/269.1 |
| 2011/0198488 A1 | | 8/2011 | Stoller et al. | |
| 2011/0313669 A1 | | 12/2011 | Thornton | |
| 2012/0197529 A1 | | 8/2012 | Stephenson et al. | |
| 2013/0293091 A1 | | 11/2013 | Perkins | |
| 2013/0294557 A1 | | 11/2013 | Perkins | |

FOREIGN PATENT DOCUMENTS

| | | | |
|---|---|---|---|
| JP | 05029095 A | * | 2/1993 |
| WO | 2013040402 A2 | | 3/2013 |

OTHER PUBLICATIONS

Reijonen et al., "Development of Advanced Neutron/Gamma generators for imaging and active interrogation applications," 2007, Proceedings of SPIE, Optics and Photonics in Global Homeland Security III edited by Theodore T. Saito, Daniel Lehrfeld, Michael J. Deweert, vol. 6540, pp. 65401p-1 to 65401p-11.*

(Continued)

*Primary Examiner* — Kiho Kim

(57) ABSTRACT

A radiation generator includes an ion source region, and an acceleration column downstream of the extractor electrode and in fluid communication with the ion source region. The ion source region and the acceleration column contain an ionizable gas. A vacuum pump pumps the ionizable gas from the acceleration column to the ion source region such that a gas pressure in the acceleration column is less than a gas pressure in the ion source region.

18 Claims, 7 Drawing Sheets

(56) References Cited

OTHER PUBLICATIONS

IAEA Radiation Technology Reports No. 1; Neutron Generators for analytical purposes, 2012.*

Creare Engineering Products—Miniature Vacuum Pumps, "Miniature Turbomolecular and Turbo/Drag Pumps," 2014, Creare Hanover, New Hampshie. http://www.creare.com/products/minivac.html, 2 pages.

Dodson "DARPA program develops world's smallest vacuum pumps with big potential," Jun. 23, 2013, http://www.gizmag.com/darpa-mems-smallest-vacuum-pumps/27883/, 10 pages.

* cited by examiner

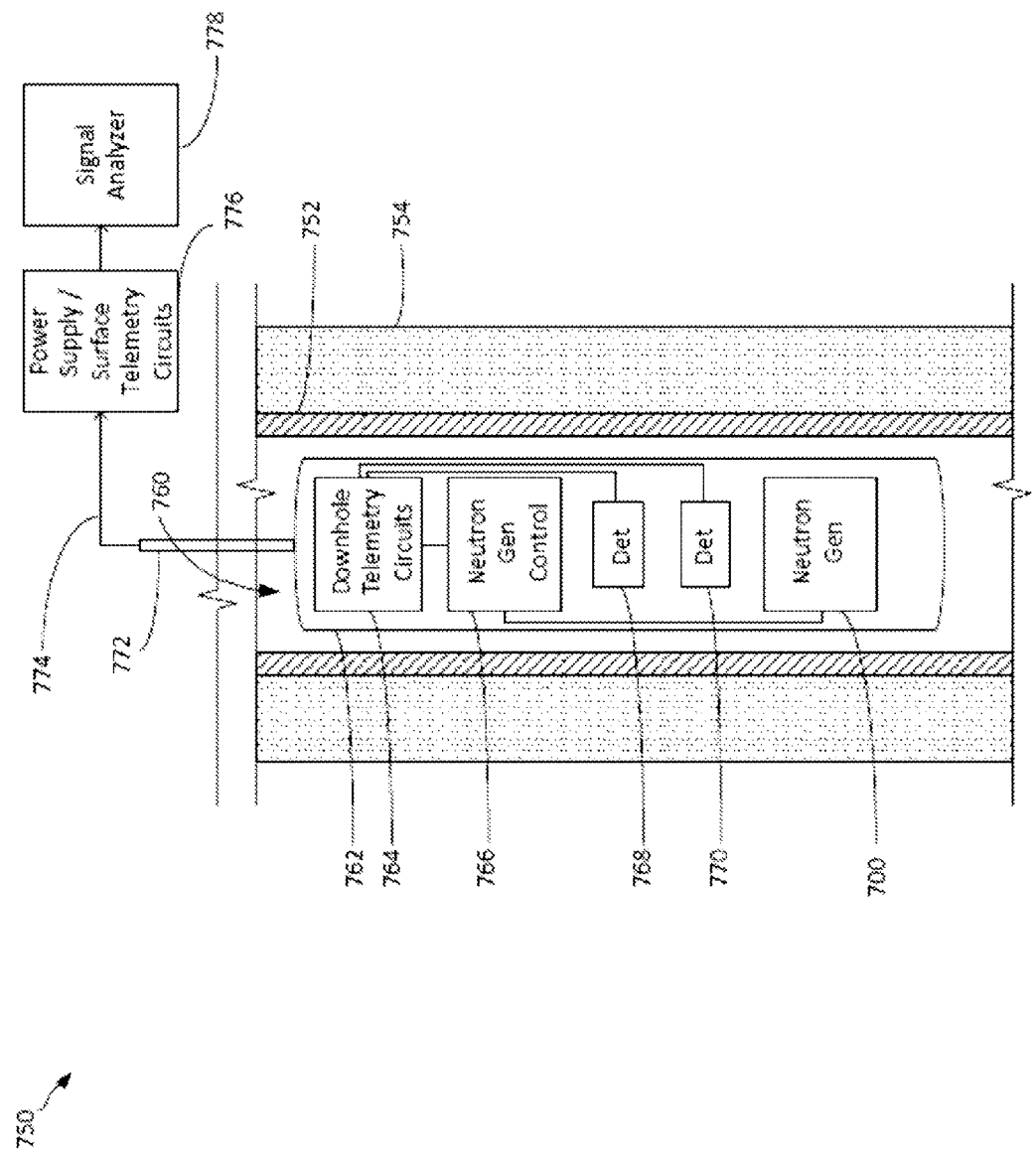

RADIATION GENERATOR HAVING AN ACTIVELY EVACUATED ACCELERATION COLUMN

FIELD OF THE DISCLOSURE

This disclosure is directed to the field of downhole radiation generation, and, more particularly, to downhole radiation generators which utilize mechanisms to actively evacuate at least some gas from their acceleration columns.

BACKGROUND

A downhole tool containing a radiation generator is useful for determining properties of a subsurface formation. Such a downhole tool may be inserted into a borehole drilled into the subsurface formation, and then emit radiation from its radiation generators. This radiation may travel into the subsurface formation and interact with constituents of the subsurface formation. These interactions may result in the emission of gamma rays or neutrons from the subsurface formation, and the downhole tool may have radiation detectors to detect this emitted radiation. Data from the radiation detectors may then be analyzed and used to determine properties of the subsurface formation.

Some radiation generators used by downhole tools may be neutron generators. A neutron generator may function by creating ions from deuterium and/or tritium gas, and then accelerating those ions through an acceleration column and toward a target. When the ions strike the target, neutrons may be generated.

While such radiation generators are useful, some drawbacks remain. For example, deleterious collisions between the ions and gas molecules in the acceleration column may occur, which may ultimately result in sputtering of components and lead to damage to parts of the radiation generator. Therefore, ways to reduce the number of these deleterious collisions are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A radiation generator may include an ion source region, and an acceleration column in fluid communication with the ion source region. The ion source region and the acceleration column may contain an ionizable gas. A vacuum pump may pump the ionizable gas from the acceleration column to the ion source region such that a gas pressure in the acceleration column is less than a gas pressure in the ion source region.

A well logging tool may include a tool housing, and at least one radiation detector carried within the tool housing. A radiation generator may be carried within the tool housing. The radiation generator may have an ion source region, and an acceleration column in fluid communication with the ion source region. The ion source region and the acceleration column may contain an ionizable gas. A vacuum pump may pump the ionizable gas from the acceleration column to the ion source region such that a gas pressure in the acceleration column is less than a gas pressure in the ion source region.

A method may be for generating radiation using a radiation generator having an ion source region, and an acceleration column in fluid communication with the ion source region. The method may include pumping ionizable gas from the acceleration column to the ion source region such that a gas pressure in the acceleration column is less than a gas pressure in the ion source region, using a vacuum pump.

BRIEF DESCRIPTION OF THE DRAWINGS

FIG. 7 is a schematic of an embodiment of a well logging instrument that employs a radiation generator in accordance with the present disclosure.

DETAILED DESCRIPTION

One or more embodiments of the present disclosure will be described below. These described embodiments are examples of the presently disclosed techniques. Additionally, in an effort to provide a concise description, certain features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. In this disclosure, when referring to a radiation generator, the direction "downstream" refers to a trajectory toward a target thereof, whereas the direction "upstream" refers to a trajectory away from the target.

Figure 1:
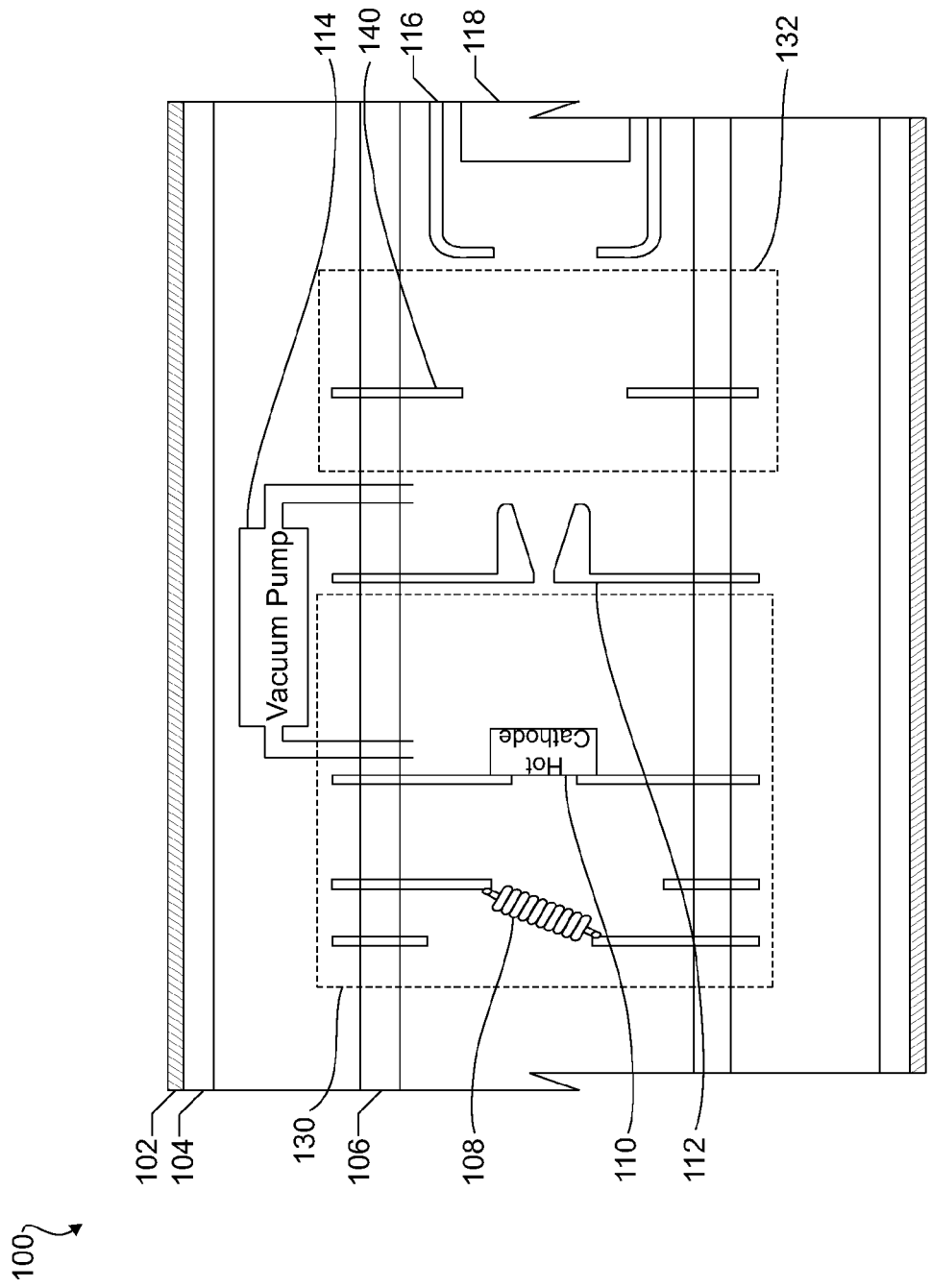
FIG. 1 is a schematic cross sectional view of a radiation generator in accordance with the present disclosure wherein the vacuum pump is adjacent the cathode.

Referring initially to FIG. 1, a radiation generator 100 is now described. The radiation generator 100 includes a housing 102 having an interior surface, with an insulator 104 on the interior surface. The insulator 104 may be a high voltage insulator constructed from ceramic material, such as $Al_2O_3$. The housing 102 also carries a vacuum envelope 106 disposed within the insulator 104. The vacuum envelope 106 may be constructed from quartz, for example. An ionizable gas is contained within the vacuum envelope 106, such as deuterium, tritium, or a mix thereof. An insulating gas, for example $SF_6$, is contained within the housing 102.

An ion source region 130 is within the sealed envelope 106. The ion source region 130 includes a gas reservoir 108, and a cathode 110 downstream of the gas reservoir. The ion source region 130 is bounded by an extractor electrode 112. Although the structure of this ion source region 130 has been described herein, those of skill in the art will readily appreciate that other types of ion sources, such as those that operate at a lower temperature and based upon a Penning discharge, or those that operate based upon ionization by microwaves or RF energy, may be used. Indeed, the disclosure herein is applicable to any sort of radiation generator with an ion source, regardless of ion source type.

The radiation generator 100 also includes an extractor electrode 112 carried within the sealed envelope 106 downstream of and bounding the ion source 130. An intermediate electrode 140 is carried within the sealed envelope 106 downstream of the extractor electrode 114. A suppressor electrode 116 is carried within the sealed envelope 106 downstream of the intermediate electrode 140. A target 118 is carried within the housing downstream of the suppressor electrode 116. The region between the extractor electrode 112 and suppressor electrode 116 is referred to as the acceleration column 132, as this is where the majority of the acceleration undergone by the ions occurs.

During operation of the radiation generator 100, the cathode 110 emits electrons toward the extractor electrode 112. Some electrons, as they travel toward the extractor electrode 112, interact with the atoms of the ionizable gas, and become ionized to form ions. There is a voltage difference between the extractor electrode 112 and the suppressor electrode 118 such that an electric field generated in the sealed envelope 106 accelerates the ions generated in the ion source 130 toward the target 120. When the ions strike the target 120, neutrons and/or gamma rays, depending upon the selection of the target material, are generated. The neutrons or gamma rays can be emitted into a material, such as a formation in a borehole. The neutrons react with nuclei in the formation, and can be either reflected back, or can cause photons such as gamma ray photons to be emitted back. These reflected or emitted neutrons or gamma ray photons can be captured by a detector (not shown). Monitoring of the detector, together with analysis of the data collected thereby, can then be used to determine properties of the formation.

Ionizable gas in the acceleration column 132 could cause a variety of undesirable reactions between the accelerated ions and the ionizable gas itself. These reactions may take the form of charge exchange reactions. In such a charge exchange reaction, the initially positively charged ion strips an electron from an atom of ionizable gas, creating a neutral particle (the detriments of which are explained below), as well as creating an ion from the ionizable gas atom. This new ion is an undesirable ion as it is accelerated by but part of the available potential difference. The undesirable ion may or may not strike the target 120. If it strikes the target 120, its diminished energy makes it much less likely to cause a neutron (or gamma) generation reaction. The charge exchange reaction also results in the creation of neutral particles. The energy and direction of the newly formed neutral particle remains because the particle is neutral, and the electric field of the acceleration column therefore does not influence its trajectory. These neutral particles may therefore travel in any direction, and may reach areas and surfaces that ions would be unable to reach. If one neutral particle strikes a metallic surface in the acceleration column 132 it may sputter material therefrom as well as cause secondary electron emission.

The material sputtered may be in the form of undesirable conductive particles, which could deposit on the inside surface of the sealed envelope 106 and build up. If enough undesirable charged or conductive particles build upon the sealed envelope 106, portions thereof may become conductive and charged, or worse, with enough undesirable conductive particles building up, an electrical short could form between the extractor electrode 112 and intermediate electrode 140, or between other components, for example. Such a short could result in damage to the radiation generator 100, rendering it inoperable.

Even a buildup that does not result in the forming of a short could, in some situations, serve to alter the potential distribution between the extractor electrode 112 and suppressor electrode 116, as well as other components. This could alter the electric field in the sealed envelope 106, and thus alter the path or cohesiveness of the ion beam, which may degrade performance of the radiation generator 100. The secondary electrons could strike the sealed envelope 106 and charge it up, or could strike an electrode and cause the generation of x-rays, which could in turn damage the high voltage insulator 106. Also, secondary electron emission can lead to undesirable current flow, which could overload the power supplies.

Such charge exchange reactions may occur adjacent the extractor electrode 112, as the ions are still traveling relatively slowly at that location. At that location, the ions have yet to form a tightly collimated ion beam, and thus their trajectories may still be divergent, contributing to their off axis travel.

To reduce the number of charge exchange reactions, the radiation generator 100 of this disclosure mechanically pumps the ionizable gas from the acceleration column 132 back into the ion source region 130, as will now be explained in detail. To effectuate this mechanical pumping, the radiation generator 100 includes a small vacuum pump 114 carried within the housing 102, such as those manufactured by Creare Engineering Research and Development, having an inlet downstream of and adjacent to the extractor electrode 112, and an outlet in the ion source region 130. To help facilitate this pumping and augment the pressure differential between the acceleration column 132 and the ion source region 130, the aperture in the extractor electrode 112 is smaller than the aperture in the intermediate electrode 140. This smaller aperture helps to reduce the amount of gas pulled from the ion source region 130 by the inlet of the vacuum pump 114, and to therefore maintain the pressure differential between the acceleration column 132 and ion source region. Indeed, the pressure in the ion source region 130 can be from 0.5 mTorr to 20 mTorr, for example, while the pressure in the acceleration column 132 can range from $10^{-4}$ Torr to $10^{-8}$ Torr.

The vacuum pump 114 is located adjacent the cathode 110 because the cathode in this application is at a reference potential (i.e. ground). In this application where the cathode 110 is at the reference potential, the target 118 is at a high negative potential, for example −70 kV to −150 kV. In other applications, such as the radiation generator 200 shown in FIG. 2, the cathode 210 may be at a high positive potential, such as +70 kV to +150 kV, while the target 218 is at the reference potential. In such applications with the target 218 at the reference potential, the vacuum pump 214 is located adjacent the target 218.

Figure 2:
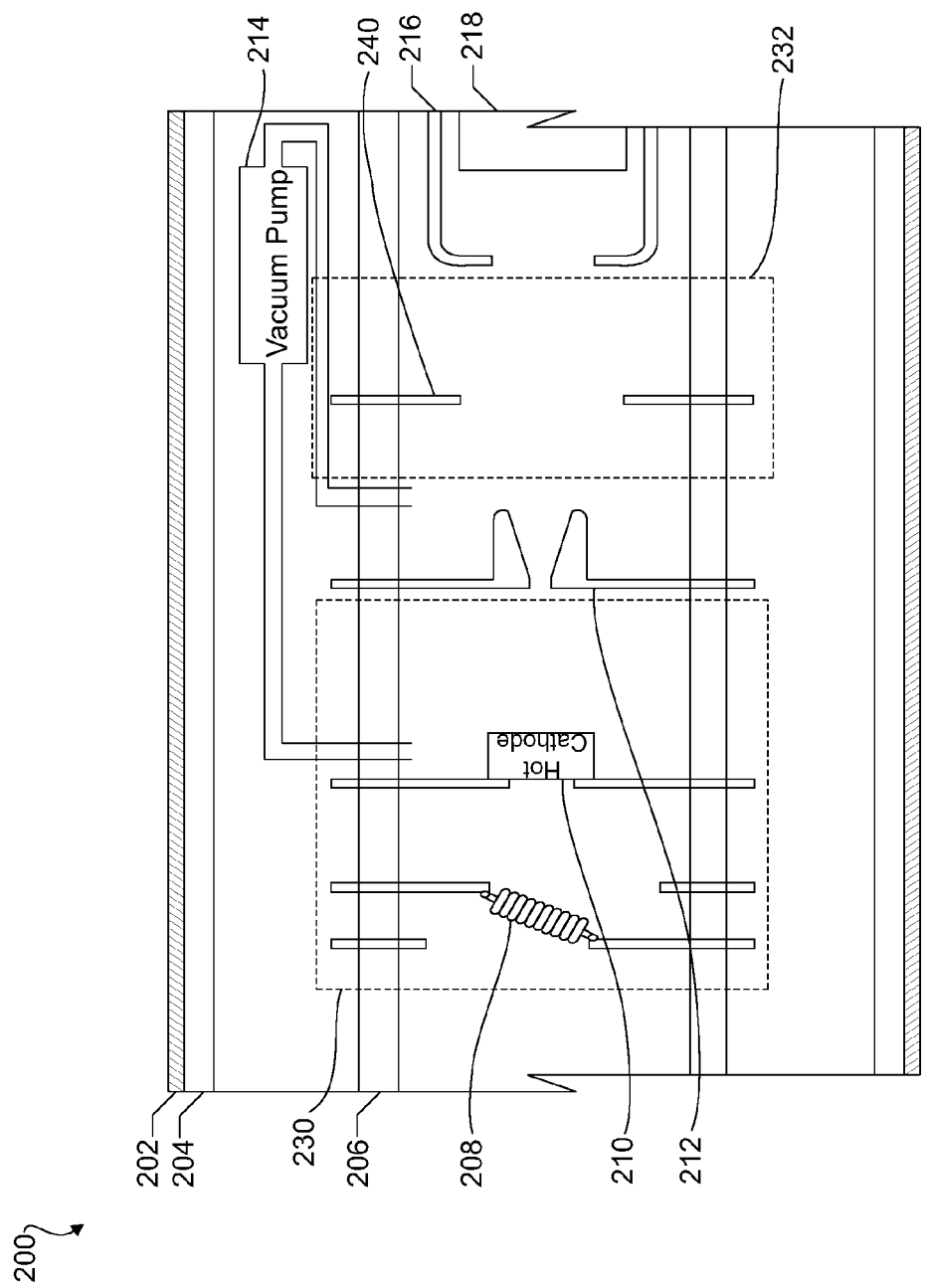
FIG. 2 is a schematic cross sectional view of a radiation generator in accordance with the present disclosure wherein the vacuum pump is adjacent the target.
Figure 3:
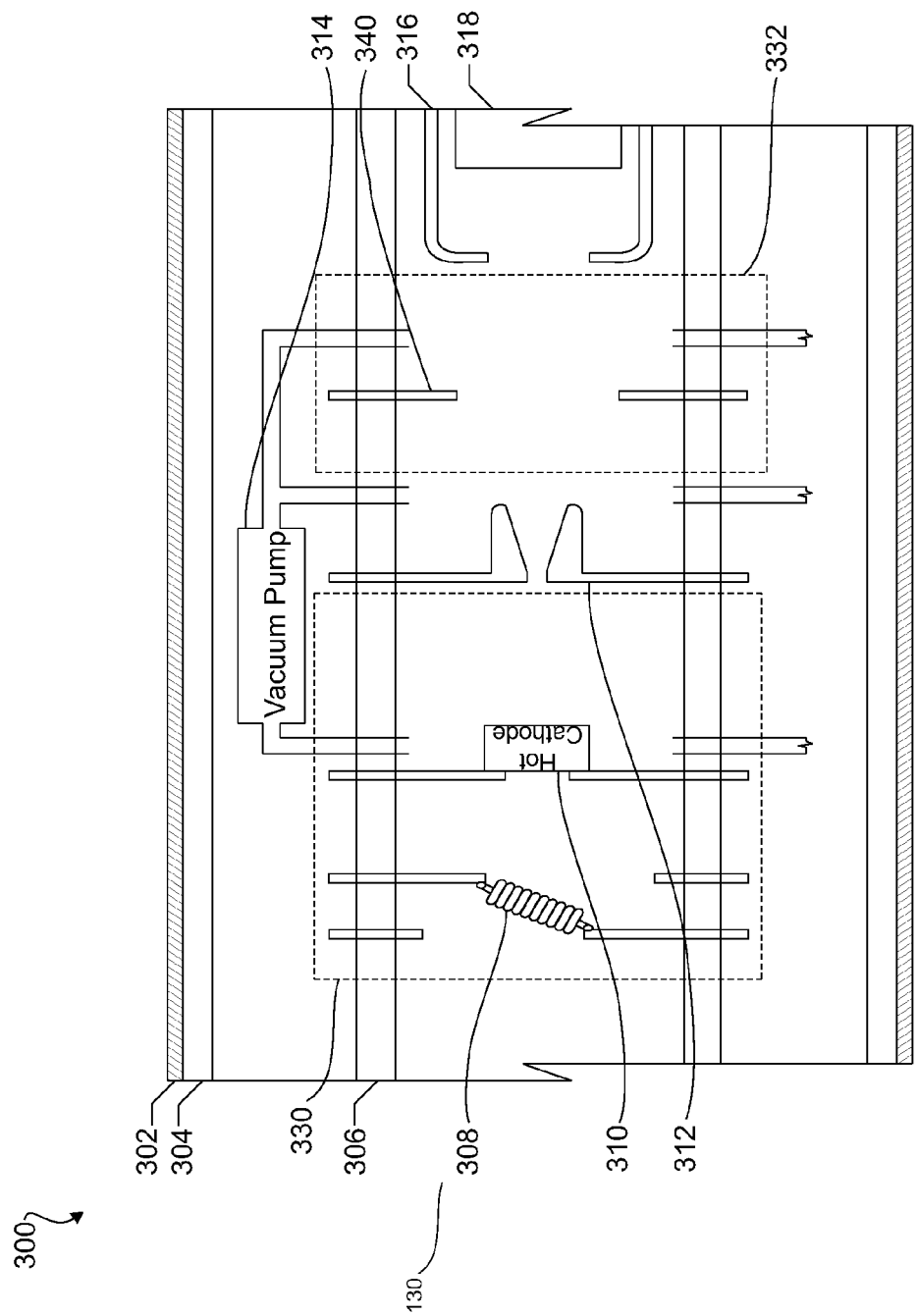
FIG. 3 is a schematic cross sectional view of a radiation generator in accordance with the present disclosure wherein the vacuum pump has multiple inlets.

Although the radiation generators 100, 200 shown in FIGS. 1-2 have a single inlet and single outlet for the vacuum pump 114, 214, it should be appreciated that there may instead be multiple inlets and multiple outlets. For example, as shown in the radiation generator 300 of FIG. 3, the vacuum pump 314 has an inlet adjacent to and downstream of the extractor electrode 312, as well as an inlet adjacent to and downstream of the intermediate electrode 312. This may help maintain the pressure differential between the ion source region 330 and the acceleration column 332 by increasing the gas conductance to the pump.

Figure 4:
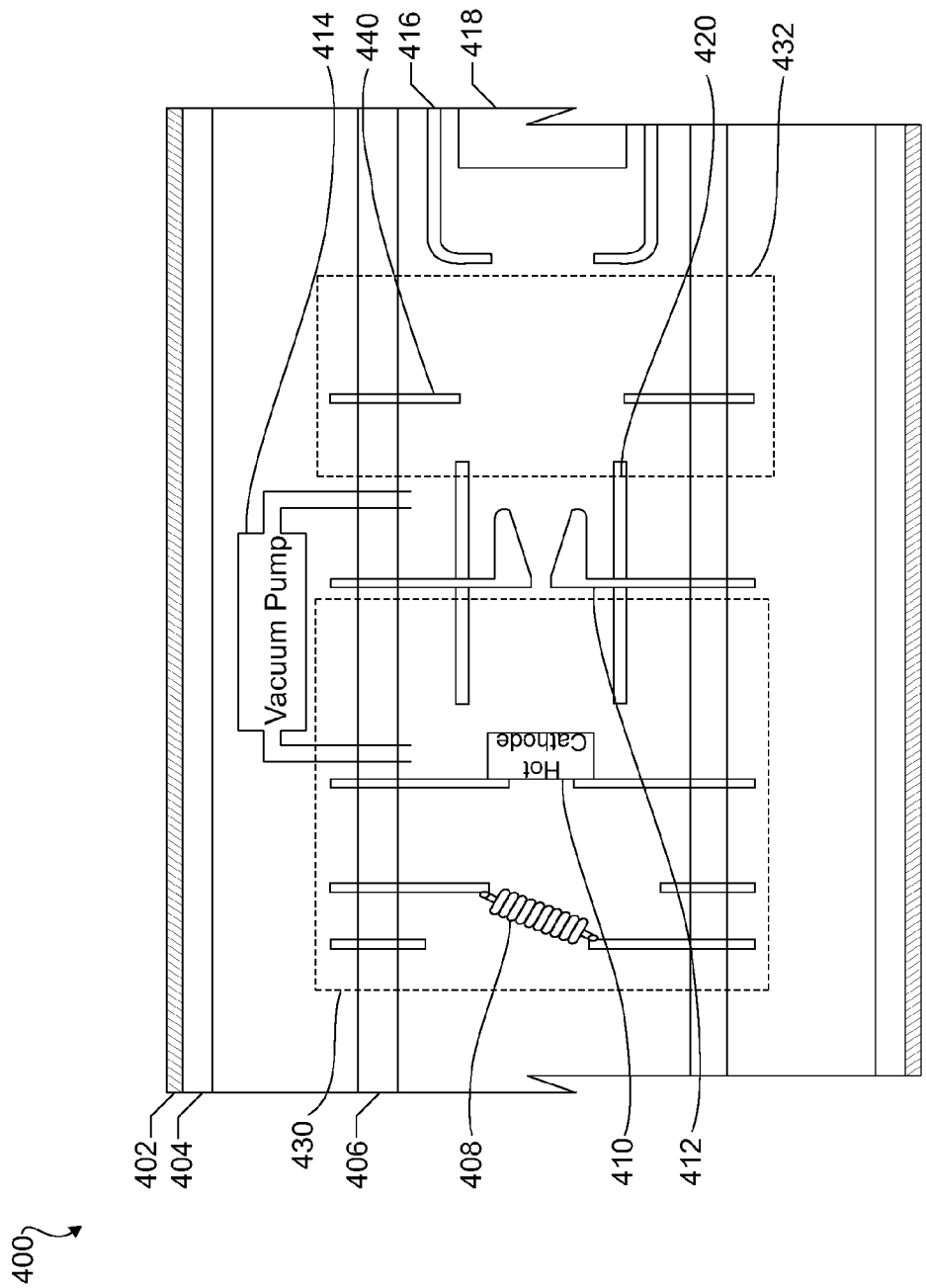
FIG. 4 is a schematic cross sectional view of a radiation generator in accordance with the present disclosure wherein there is a pipe associated with the extractor.
Figure 5:
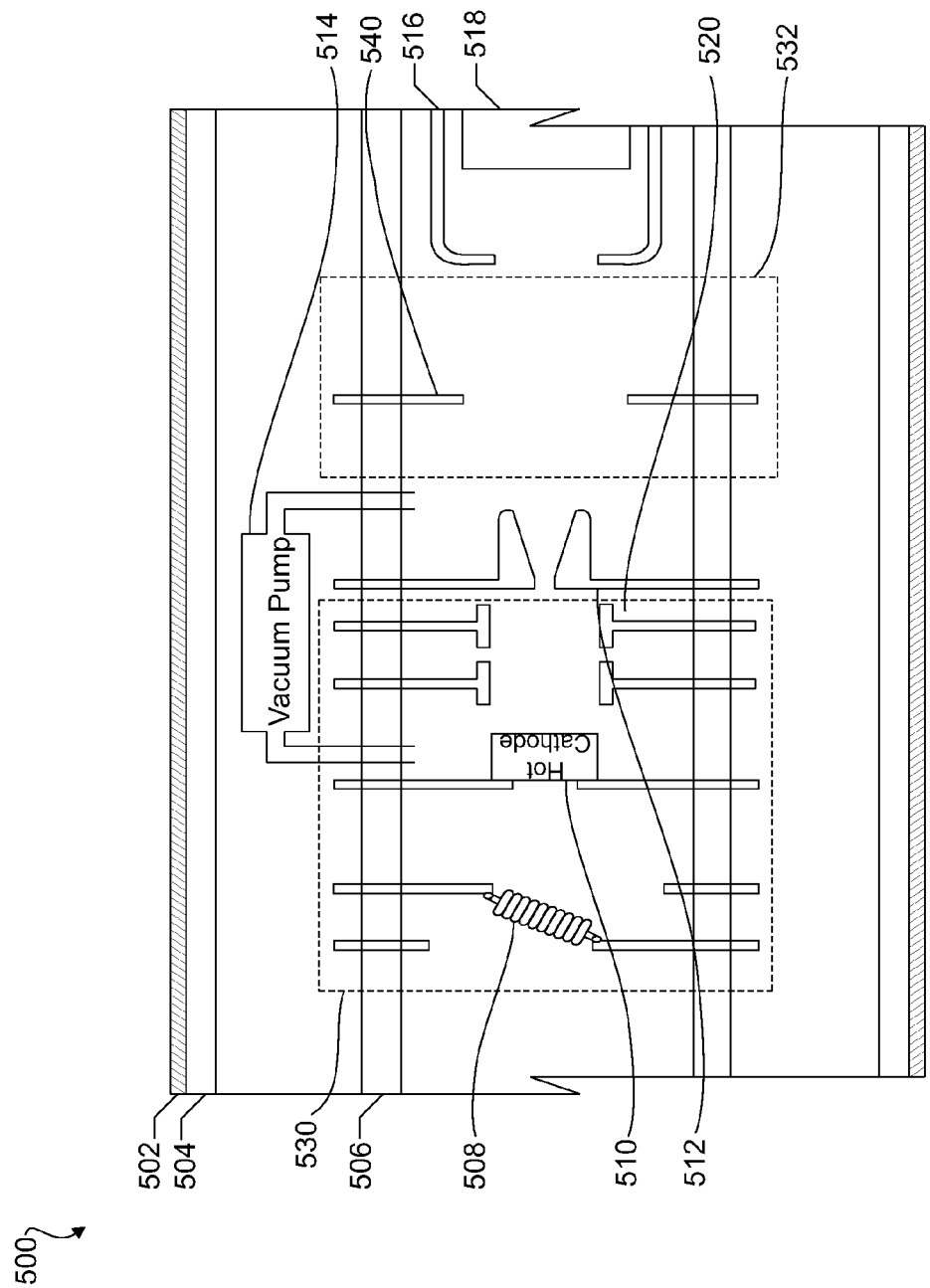
FIG. 5 is a schematic cross sectional view of a radiation generator in accordance with the present disclosure wherein there is a discontinuous pipe associated with the extractor.

Referring now to FIG. 4, to help further reduce the flow of gas traversing through the extractor electrode 412, and to help maintain the pressure differential between the acceleration column 432 and ion source region, at least one pipe 420 is associated with the extractor electrode 412. As illustratively shown, the pipe 420 may extend through the extractor electrode 412, although in some applications it could extend through the aperture in the extractor electrode. As also shown, the pipe 420 may extend farther along the longitudinal axis of the radiation generator 400 than the extractor electrode 412, and may be continuous. In some applications, as shown in FIG. 5, the dielectric pipe 520 may instead be discontinuous, and may be comprised of multiple structures. The pipe 520 may be comprised of multiple conductive electrodes that are at a same potential as the extractor electrode 412, or with the voltage of each successive electrode being greater than the voltage of the preceding electrode. In some applications, the pipe 520 may be constructed from a dielectric material. Also, in some applications, there may be multiple different pipes 520 associated with the extractor electrode 512, with the multiple different pipes being located at different radial locations.

Figure 6:
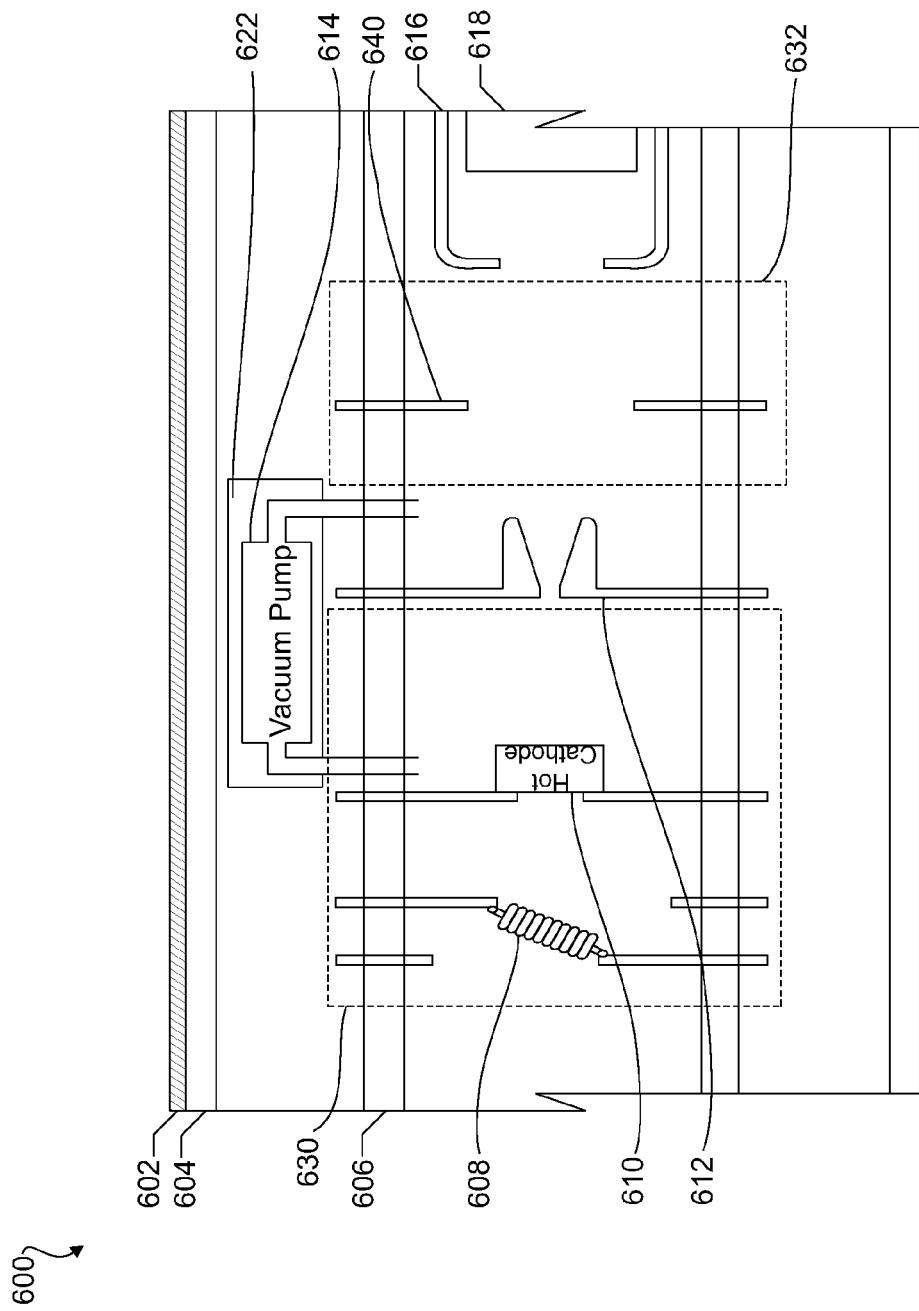
FIG. 6 is a schematic cross sectional view of a radiation generator in accordance with the present disclosure wherein the vacuum pump is within a cooling unit.

Referring now to FIG. 6, due to the high temperatures of some borehole environments, as well as the high operating temperatures of and in the sealed envelope 602, it may be desirable to cool the vacuum pump 614 with a cooling structure 622. The cooling structure 622 may be closed or partially open dewar flask, for example, or may be an active cooling unit such as a thermoelectric (Peltier) cooler. This cooling helps extend the life of the vacuum pump 614, and helps ensure that the vacuum pump does not overheat.

Referring again to FIG. 1, by creating the pressure differential between the ion source region 130 and the acceleration column 132, the likelihood of charge exchange reactions between ions and gas particles in the acceleration column is reduced due to the reduced number of gas particles in the acceleration column. This could increase the operational life of such a radiation generator 100. In addition, since the design of the acceleration column 132 is strongly influenced by operating pressure (in that the higher the expected operating pressure, the greater the separation used, or the lower the voltage used, between the extractor electrode 112, intermediate electrode 140, and suppressor electrode 116 to help prevent arcing), the use of the vacuum pump 114 facilitates a reduction in length of the radiation generator 100 for a given voltage between the extractor 112 and target 118. This enables the radiation generator 100 to have a greater voltage between the extractor 112 and target 118 for a given acceleration column 132 length. This greater voltage may increase the radiation output of the radiation generator 100.

It should be noted that in the event of vacuum pump 114 failure, the radiation generator 100 still remains operational. However, the radiation generator 100 may suffer from increased wear when running with a broken vacuum pump 114 as opposed to when running with a functioning vacuum pump. A failure could be detected by monitoring the electrical parameters of the vacuum pump 114, or by monitoring the performance of the radiation generator 100.

Turning now to FIG. 7, an example embodiment of a well logging instrument 760 that employs the radiation generator 700 as taught herein, shown in operation at a well site 750, is now described. A pair of radiation detectors 768, 770 are positioned within a sonde housing 762 along with a radiation generator 700 (e.g., as described above) and associated high voltage electrical components (e.g., power supply). The radiation generator 700 employs an ion source in accordance with the present embodiment and as described above. Control circuitry 766 for the radiation generator 700 (e.g., low voltage control components) and other components, such as downhole telemetry circuits 764, may also be carried in the sonde housing 762.

The sonde housing 762 is to be moved through a borehole. In the illustrated example, the borehole is lined with a steel casing 752 and a surrounding cement annulus 754, although the sonde housing 762 and radiation generator 700 may be used with other borehole configurations (e.g., open holes). By way of example, the sonde housing 762 may be suspended in the borehole by a cable 772, although a coiled tubing may also be used. Furthermore, other modes of conveyance of the sonde housing 762 within the borehole may be used, such as wireline, slickline, and logging while drilling (LWD), for example. The sonde housing 762 may also be deployed for extended or permanent monitoring in some applications.

A multi-conductor power supply cable 774 may be carried by the cable 772 to provide electrical power from the surface (from power supply circuitry 776) downhole to the sonde housing 762 and the electrical components therein (i.e., the downhole telemetry circuits 764, control circuitry 766, and one or more of the above-described radiation detectors 768, 770). However, in other configurations power may be supplied by batteries and/or a downhole power generator, for example.

The radiation generator 700 is operated to emit radiation (i.e. neutrons or gamma rays) to irradiate the geological formation adjacent the sonde housing 762. Gamma rays or neutrons that return from the formation are detected by the radiation detectors 768, 770. The outputs of the radiation detectors 768, 770 are communicated to the surface via the downhole telemetry circuitry 764 and the surface telemetry circuits 776 and may be analyzed by a signal analyzer 778 to obtain information regarding the geological formation. By way of example, the signal analyzer 778 may be implemented by a computer system executing signal analysis software for obtaining information regarding the formation. More particularly, oil, gas, water and other elements of the geological formation have distinctive radiation signatures that permit identification of these elements. Signal analysis can also be carried out downhole within the sonde housing 762 in some embodiments.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A radiation generator comprising:
an ion source region;
an acceleration column in fluid communication with the ion source region;
the ion source region and the acceleration column containing an ionizable gas; and
a vacuum pump to pump the ionizable gas from the acceleration column to the ion source region such that a gas pressure in the acceleration column is less than a gas pressure in the ion source region, wherein the vacuum pump is contained within a cooling structure.

2. The radiation generator of claim 1, further comprising a cathode within the ion source region, the cathode being at a reference potential; and wherein the vacuum pump is axially adjacent the ion source region.

3. The radiation generator of claim 2, further comprising a sealed envelope containing the ion source region, and a housing carrying the sealed envelope within; wherein the cathode and the acceleration column are disposed within the sealed envelope; and wherein the vacuum pump is carried within the housing.

4. The radiation generator of claim 1, further comprising a target downstream of the acceleration column, the target being at a reference potential; and wherein the vacuum pump is axially adjacent the target.

5. The radiation generator of claim 4, further comprising a sealed envelope containing the ion source region, and a housing carrying the sealed envelope within; wherein the target and the acceleration column are disposed within the sealed envelope; and wherein the vacuum pump is carried within the housing.

6. The radiation generator of claim 1, further comprising an extractor electrode bounding the ion source region; wherein the vacuum pump has an inlet downstream of, and adjacent to, the extractor electrode; and wherein the vacuum pump has an outlet inside the ion source.

7. The radiation generator of claim 6, further comprising at least one acceleration electrode within the acceleration column; and wherein the vacuum pump has at least one additional inlet adjacent to the at least one acceleration electrode.

8. The radiation generator of claim 1, wherein the vacuum pump has at least one additional inlet at a same axial location as the inlet but radially spaced apart from the inlet.

9. The radiation generator of claim 1, further comprising an extractor electrode bounding the ion source region; further comprising at least one acceleration electrode within the acceleration column and having an aperture therein; and wherein the extractor electrode has an aperture therein smaller than the aperture in the at least one acceleration electrode.

10. The radiation generator of claim 1, wherein the cooling structure comprises a dewar flask, an active cooling unit, or a thermoelectric cooler.

11. The radiation generator of claim 1, wherein the ionizable gas consists essentially of deuterium, or consists essentially of tritium.

12. A radiation generator comprising:
an ion source region;
an acceleration column in fluid communication with the ion source region;
the ion source region and the acceleration column containing an ionizable gas;
a vacuum pump to pump the ionizable gas from the acceleration column to the ion source region such that a gas pressure in the acceleration column is less than a gas pressure in the ion source region;
an extractor electrode bounding the ion source region; and further comprising
at least one pipe associated with the extractor electrode.

13. The radiation generator of claim 12, wherein the at least one pipe extends farther along a longitudinal axis of the radiation generator than the extractor electrode.

14. The radiation generator of claim 12, wherein the at least one pipe is continuous.

15. A well logging tool comprising:
a tool housing;
at least one radiation detector carried within the tool housing; and
a radiation generator carried within the tool housing and comprising
an ion source region,
an acceleration column in fluid communication with the ion source region,
the ion source region and the acceleration column containing an ionizable gas,
a vacuum pump to pump the ionizable gas from the acceleration column to the ion source region such that a gas pressure in the acceleration column is less than a gas pressure in the ion source region, and
an extractor electrode bounding the ion source region;
wherein the vacuum pump has an inlet downstream of, and adjacent to, the extractor; and
wherein the vacuum pump has an outlet inside the ion source.

16. The well logging tool of claim 15, further comprising a cathode within the ion source region, the cathode being at a reference potential; and wherein the vacuum pump is axially adjacent the ion source region.

17. The well logging tool of claim 15, further comprising a target downstream of the acceleration column, the target being at a reference potential; and wherein the vacuum pump is axially adjacent the target.

18. The well logging tool of claim 15, further comprising at least one acceleration electrode within the acceleration column and having an aperture therein; and wherein the extractor electrode has an aperture therein smaller than the aperture in the at least one acceleration electrode.

* * * * *